United States Patent [19]

Stone

[11] 4,271,733
[45] Jun. 9, 1981

[54] ROTARY TOOLS

[75] Inventor: Ronald L. Stone, Dorchester, England

[73] Assignee: United Kingdom Atomic Energy Authority, London, England

[21] Appl. No.: 68,881

[22] Filed: Aug. 23, 1979

[30] Foreign Application Priority Data

Sep. 8, 1978 [GB] United Kingdom ............... 36114/78

[51] Int. Cl.³ .............................................. B23B 3/22
[52] U.S. Cl. ..................................................... 82/4 C
[58] Field of Search ......................................... 82/4 C

[56] References Cited

U.S. PATENT DOCUMENTS

| | | | |
|---|---|---|---|
| 1,829,458 | 10/1931 | Scoggins | 82/4 C |
| 2,699,604 | 1/1955 | Ingwer et al. | 82/4 C |
| 2,747,274 | 5/1956 | Willard et al. | 82/4 C |
| 4,050,836 | 9/1977 | Anders | 82/4 C |
| 4,114,484 | 9/1978 | Feamster | 82/4 C |

*Primary Examiner*—Harrison L. Hinson
*Attorney, Agent, or Firm*—Larson, Taylor and Hinds

[57] ABSTRACT

A rotary tool for working in a cramped and possibly hostile environment. The tool can be clamped into position and left to work automatically. The tool has a resiliently biased pin and a ratchet driven cam for ensuring that the working unit cannot become overloaded. Working cannot go beyond a preselected level owing to the action of the ratchet driven cam which is only stepped to a certain level on a flange which strikes a lever when that level is reached. The work done can be cutting, welding preparation or trepanning.

10 Claims, 13 Drawing Figures

ROTARY TOOLS

BACKGROUND OF THE INVENTION

This invention relates to rotary tools for metal working for example cutting, preparing and welding of pipes and trepanning.

A known example of rotary tool is heavy and cumbersome and difficult to position in confined areas. Moreover, a known example of tool has to be controlled by an operator or operators which is time consuming and may be dangerous in an hostile environment. An object of the present invention is to provide a rotary tool which mitigates the above difficulties and which can be left to complete a metal working operation automatically, once positioned.

SUMMARY OF THE INVENTION

According to the present invention, a rotary tool for metal working comprises a drive unit attachable to the metal to be worked, a drive detachably engageable in the drive unit and a rotary metal working unit driven by the drive unit, the drive unit includes means for controlling the extent of working by the metal working unit. Preferably the means for controlling the extent of working comprises means for dectecting loading on the working unit and controlling working to restrict said loading to within a preselected limit. Advantageously said means for detecting loading and controlling working comprises a spring loading of preselected resilience. Conveniently, the means for controlling the extent of working comprises means for stopping further working after a preselected degree of working has been completed. The metal working unit may be resiliently mounted to allow for sudden sharp transient loads on the working unit. The metal working unit may comprise a pipe cutter. Advantageously, the pipe cutter comprises a pipe cutting wheel which is urged towards the pipe by means including a ratchet fed cam.

Alternatively, the metal working unit may comprise a pipe weld preparation tool. Preferably, the drive unit is attachable to the pipe by means of an expandible plug.

Alternatively, the metal working unit comprises a trepanning tool.

DESCRIPTION OF THE DRAWINGS

The invention will be illustrated by the following description of a tool for cutting, preparing and welding pipes and trepanning. The description is given by way of example only and has reference to the accompanying drawings in which.

DESCRIPTION OF THE PREFERRED EMBODIMENTS

Figure 1:
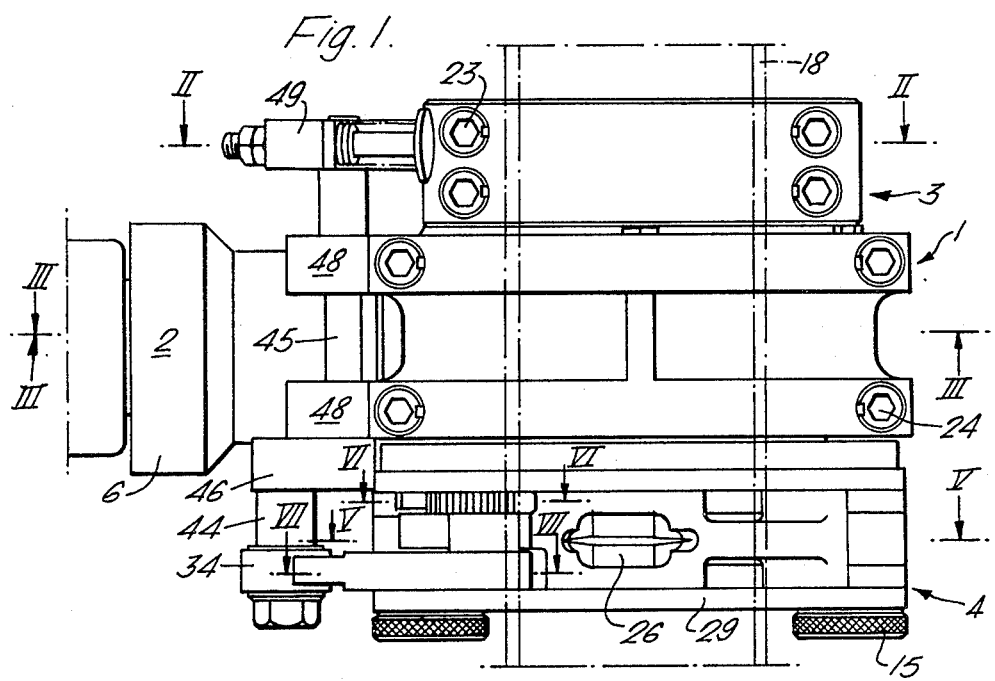
FIG. 1 is a side view of a tool having a driving unit and a pipe cutting unit.

Referring first to FIG. 1 there is illustrated a pipe-cutting tool having a driving unit 1 detachably connected to a portable electric drill 2, a pipe-clamping unit 3 connected to the stationary part of the driving unit 1 and a cutting unit 4 releasably connected to the movable part of the driving unit 1.

The driving unit 1 has a stationary part 5 including a housing 6 in which the electric drill 2 is received. The electric drill drives a shaft 7 supported in thrust bearings 8 through a torque limiter 9. The shaft 7 carries a worm 10 which drives a worm wheel 11 which runs in a groove 12 in the stationary part 5 of the driving unit. The worm wheel forms a portion of the movable part of the driving unit, the other parts being an annular plate 13 and two studs 14 on which the cutting unit 4 or a pipe preparation or orbital welding unit (to be described hereinafter) may be fitted. The cutting unit is held in place on the studs 14 by screws 15.

So that the driving unit can be placed on a pipe the stationary part 5 of the driving unit, the clamping unit 3, the worm wheel 11 and the plate 13 are each made in two parts. To fit the driving unit to a pipe the part of the stationary part of the driving unit which includes the housing 6 (that is those components shown below the chain dotted line 16 in FIG. 3) is placed on the pipe. A semicircular clamping member 17 which forms one part of the clamping unit 3 is then bolted by bolts 23 onto the stationary part 5 so that the stationary part is clamped onto the pipe 18 (see FIG. 1). A further component 19 comprising a semi-circular casing 20, a semi-circular half 21 of the worm wheel 11 and a semi-annular part 22 of the plate 13 is then bolted by bolts 24 to the stationary part 5. When the unit is so assembled and the drill 2 is energised the worm 10 drives the worm wheel 11 to cause rotation of the plate 13 relative to the stationary part 5 and thus relative to the pipe 18.

Figure 2:
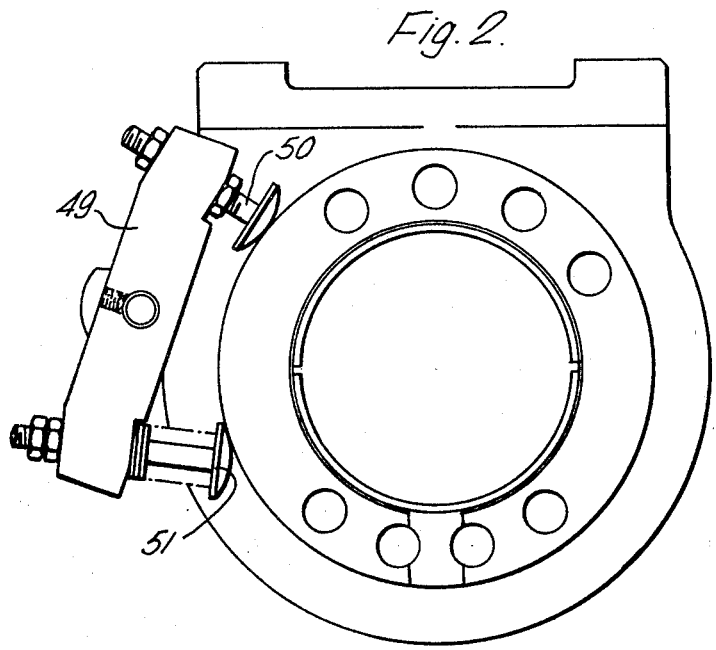
FIG. 2 is a sectional view taken along the line II—II of FIG. 1.
Figure 3:
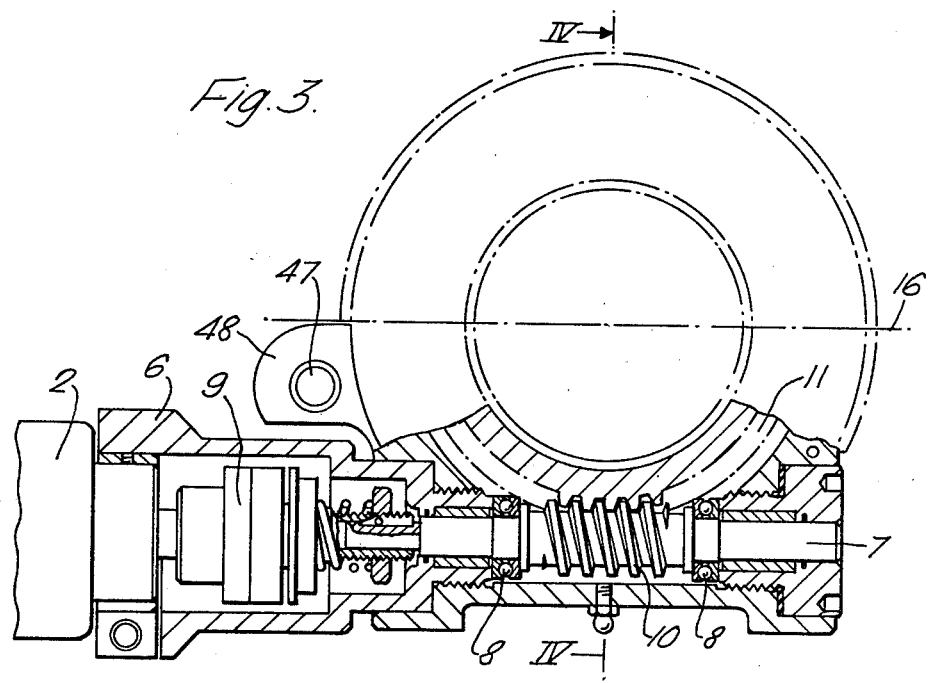
FIG. 3 is a view partially in section of the driving unit taken along the line III—III of FIG. 1.
Figure 6:
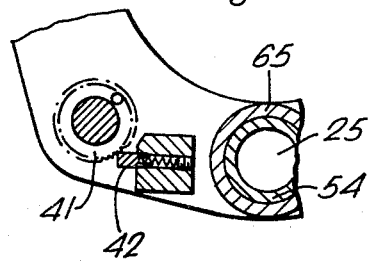
FIG. 6 is a scrap-sectional view of the cutting unit taken along the line VI—VI of FIG, 1.
Figure 7:
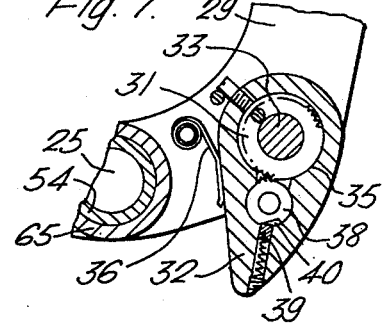
FIG. 7 is a scrap-sectional view of the cutting unit taken along the line VII—VII of FIG. 1.
Figure 8:
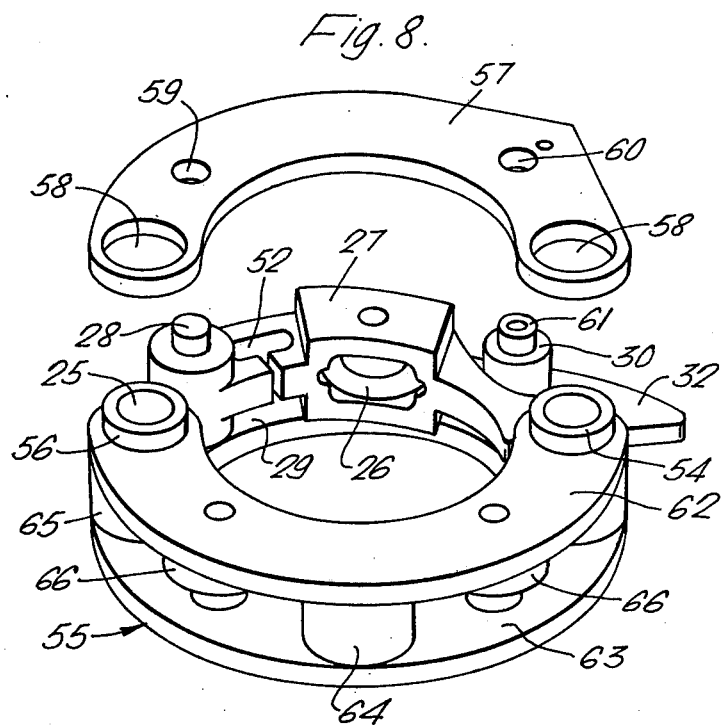
FIG. 8 is a perspective view, partially exploded, of the cutting unit.

The cutting unit 4 will now be described. The cutting unit is connected to the driving unit by the studs 14 which pass through apertures 25 in the cutting unit 4 and is held thereon by the screws 15. The cutting unit comprises a cutting wheel 26 rotatably mounted on an arm 27 which is pivoted around a stud 28 on a first substantially semi-annular support plate 29. The cutting wheel is urged towards the pipe to be cut by a pillar 30 on a rachet-fed cam 31 rotatably received in a rocker arm 32 which is pivotted around the point 33 (see FIG. 7). As the cutting unit rotates the rocker arm contacts a spring loaded roller 34 which causes the rachet-fed cam 31 to advance one notch and so move the pillar 30 closer to the centre of the cutting tool and so to move the cutting wheel inwards to increase the depth of cut in the pipe. To limit the depth of cut in the pipe the rachet notches are omitted from a portion 35 of the circumference of the rachet fed cam 31. A spring 36 urges the rocker arm 32 to return to its rest position in which a stop 37 on the arm 32 contacts a stop in the support plate 29. The rachet-fed cam 31 is advanced by a pawl 38 the movement of which is limited by a spring loaded pin 39 which enters a cutaway portion 40 of the pawl 38. The cam, once advanced, is held by a non-return ratchet and pawl device (illustrated in FIG. 6) in which a rachet 41 is allowed to rotate in one direction only by a spring loaded pawl 42. The spring loading on the roller 34 is such that if the loading on the cutting wheel becomes excessive the rocker arm is not operated to advance the rachet fed cam but the roller 34 is deflected. This is illustrated in FIGS. 1 and 2 in which the roller 34 is shown rotatably mounted on a shaft 44 which is connected to a rod 45 by a crank 46. The rod 45 is located in apertures 47 in flanges 48 on the driving unit 1 (FIG. 3). A rocker arm 49 is mounted on the rod 45 and has a fixed stop 50 and a spring-loaded stop 51. If the pressure applied to the roller 34 does not overcome the force exerted by the spring-loaded stop 51 on rocker arm the roller 34 is not deflected and the cam 31 is advanced one notch. If however the pressure on the roller 34 exceeds the force exerted by the spring-loaded stop 51 the roller 34 is deflected.

Figure 9:
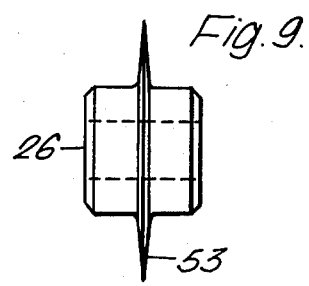
FIG. 9 is a cross-sectional view of a cutting wheel for use in the cutting unit illustrated in FIGS. 5 to 8.

The cutting wheel 26 is rotatably mounted on an arm 27 which is so designed that it flexes under the application of the movement applied to it by the step wise movement of the pillar 30. If the arm did not flex in this way the load applied as the cam 31 operated to advance the cutting wheel might be sufficiently high to cause damage to the cutting wheel 26. The arm has a cutaway portion 52 which provides the required flexibility in the arm. The preferred material for the arm is available under the trade designation NONVAR BS 4659 Grade B01 and the material is hardened at 780° C. to 820° C. for 15 minutes and tempered at 250° C. to 260° C. The cutting wheel 26 has the profile shown in FIG. 9 in which the taper on the blade portion 53 is ground to 10° to reduce the size of the burrs produced by the wheel and so that a smaller operating torque is required.

The support plate 29 also has two tubular pillars 54 the bore of which provides the apertures 25 by means of which the cutting unit is connected to the driving unit. A further substantially semi-annular member 55 has apertures 56 at its outer ends into which may be received the pillars 54. A second support plate 57 having apertures 58 to receive the pillars 54 and apertures 59, 60 to receive the ends of the stud 28 and a projection 61 on the pillar 30 is provided and is placed over the pillars 54, stud 28 and projection 61 when the cutter unit is assembled.

The further member 55 comprises a first plate 62 and a second plate 63 separated by a block 64 and spacer collars 65. Between the first and second plates are rotatably mounted two grooved reaction wheels 66. The grooves in the wheels 66 straddle the burrs thrown up by the action of the cutting wheel.

When assembling the cutting unit on the driving unit which has been fitted to a pipe the pillars 54 are placed over the studs 14 so that the support plate 29 abuts the plate 13. The further member 55 is then fitted over the pillars 54 and the second support plate 57 fitted. The screws 15 are then tightened to securely connect the cutting unit 4 and the driving unit 1. Should the cutting wheel become damaged in use the stud 28 must be moved to release the tension on the arm 27. The second support plate 57 can then be removed to give access to the arm 27 supporting the cutting wheel 26. When a new wheel has been fitted and the cutting unit has been reassembled the combined cutting and driving unit must be repositioned on the pipe and a new cut commenced. When the cutting unit is connected to the driving unit as shown in FIG. 1 and the drill 2 is energised the cutting unit rotates relative to the pipe and the cutting wheel makes a circumferential cut in the pipe. Each time the cutting unit rotates the arm 32 contacts the roller 54 and if the loading on the spring loaded stop is not exceeded the arm 32 is operated to cause the cam 31 to advance one groove so that the cutting wheel is moved towards the pipe to increase the depth of cut. When the cut is of a depth predetermined by the number and position of the notches on the cam 31 no further inward movement of the cutting wheel 26 occurs.

Figure 4:
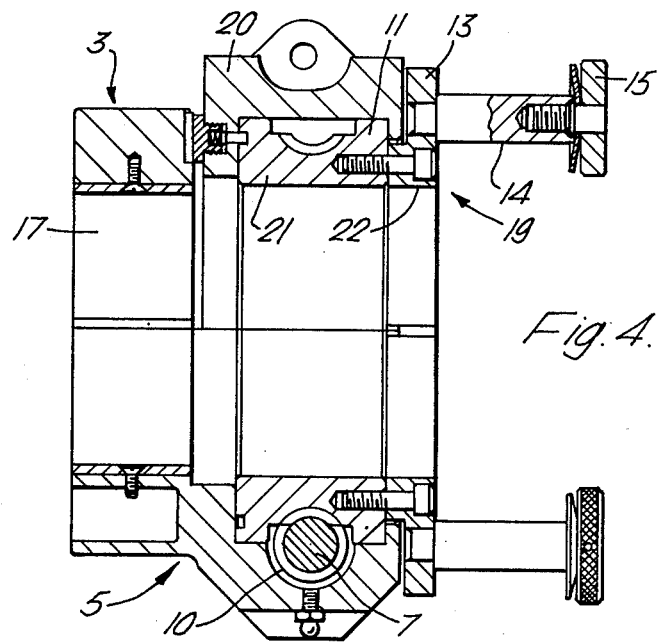
FIG. 4 is a cross-sectional view along the line IV—IV of FIG. 3 showing only the driving unit.
Figure 5:
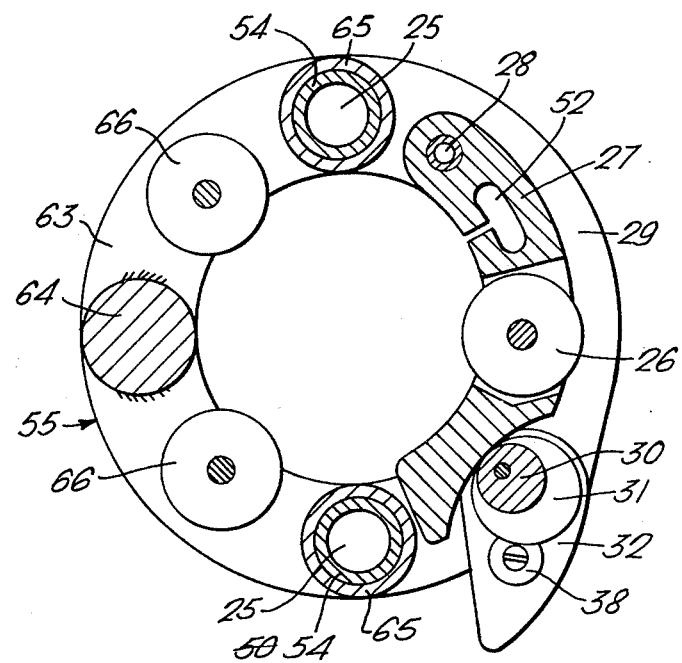
FIG. 5 is a cross-sectional view of the cutting unit taken along the line V—V of FIG. 1.
Figure 10:
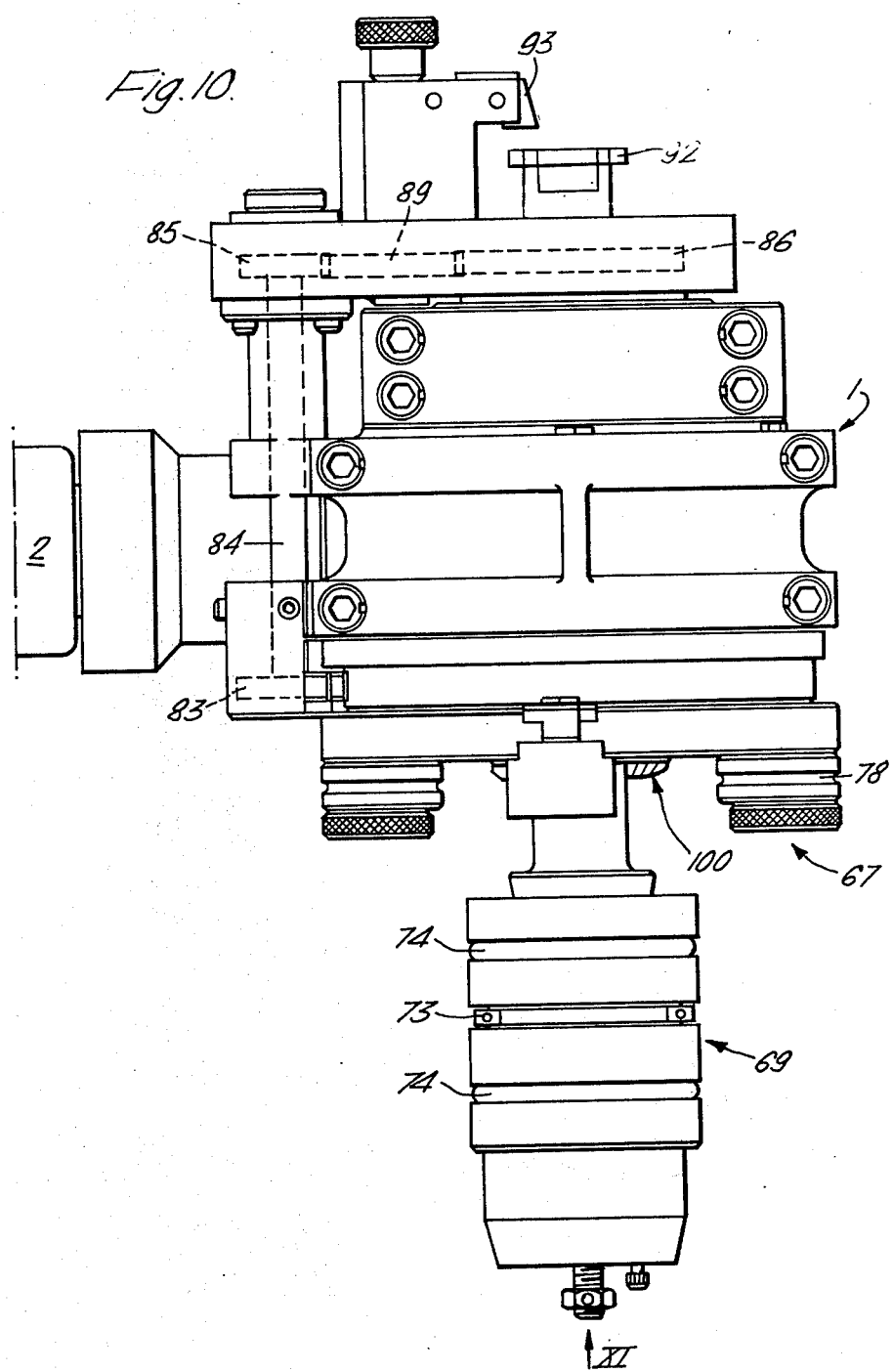
FIG. 10 is a side view of a tool having a driving unit and a pipe preparation unit.
Figure 11:
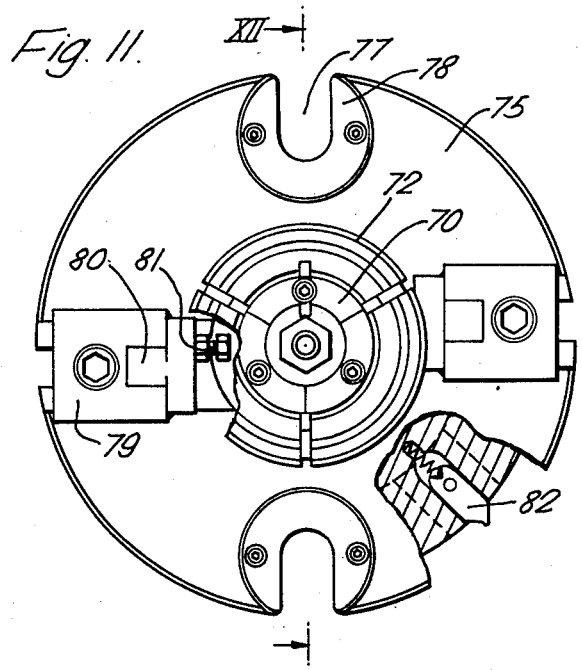
FIG. 11 is a view partially in section of the pipe preparation unit of FIG. 10 viewed in the direction of the arrow XI of FIG. 10.
Figure 12:
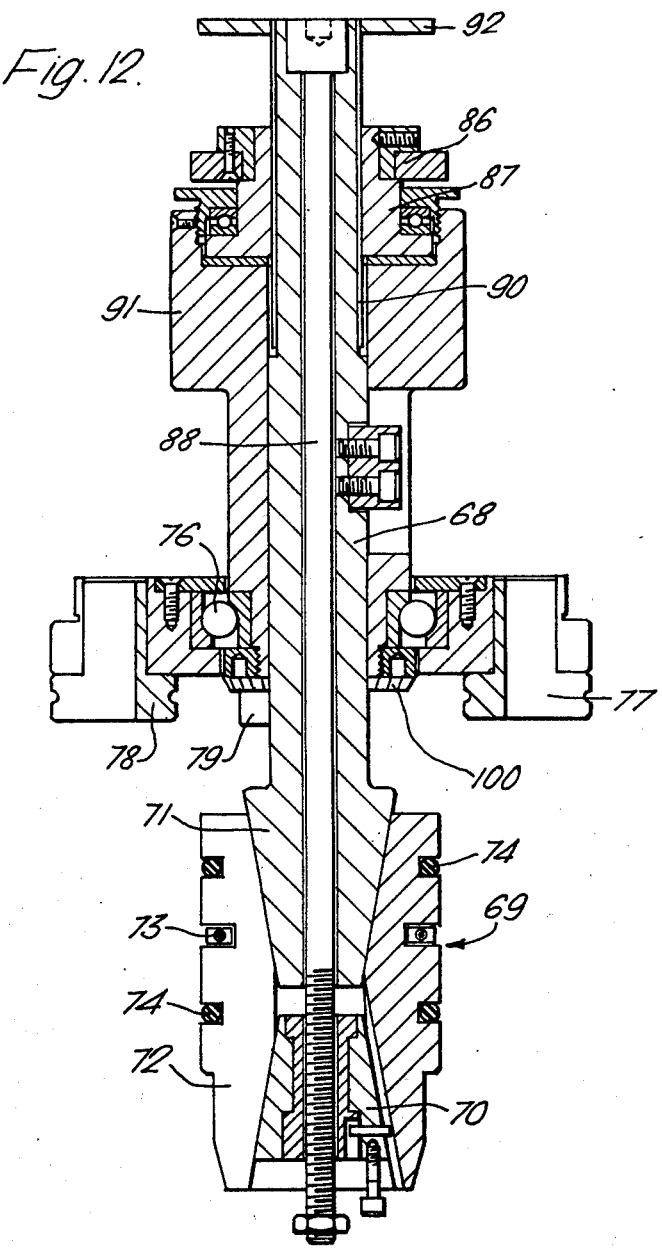
FIG. 12 is a cross-sectional view of the pipe preparation unit of FIG. 10 taken along the line XII—XII of FIG. 11.

FIGS. 10 to 12 show a tool for preparing a pipe for welding. The tool has a driving unit 1 which is identical with that described hereinbefore with reference to FIGS. 3 and 4. Connected to the movable part of the driving unit is a pipe preparation unit 67 comprising a central shaft 68 having an expanding plug 69 at one end to fit into and, when expanded, to grip and occlude the bore of the pipe to be prepared. The plug 69 is expanding by rotating a central rod 88 passing through a bore in the centre of the shaft 68 so that a tapered screwthreaded portion 70 is drawn towards a tapered enlarged end portion 71 of the shaft 68. As the portions 70, 71 move towards one another the outer portions 72 of the plug of which there are three (see FIG. 11) are urged outwards. The outer portions are held together by a retaining ring 73 and have sealing rings 74 to contact the inside of the pipe to be prepared.

A plate 75 which is mounted around the shaft 68 in a ball bearing 76 is connected to the movable part of the driving unit. Slots 77 in the plate 75 and packing pieces 78 engage with the studs 14 and screws 15 to connect the plate to the driving unit. The plate supports tool holders 79 on which can be mounted cutting tools 80 using bolts 81. The tools 80 can be used for turning the outside of the pipe, boring the inside of the pipe or facing the end of the pipe. The shaft 68 carries a level gear 100 which is referred to below in connection with FIG. 13.

The plate carries a spring loaded pin 82 which contacts a nine teeth star wheel 83 mounted on a shaft 84 which is carried in the apertures 47 in the flanges 48 (FIG. 3) of the driving unit. The spring loading of the pin 82 is such that the pin will be depressed and will not turn the star wheel 83 when a sufficient force is being applied to the shaft. The shaft carries a gear wheel 85 which drives a gear wheel 86 on a collar 87 around the shaft 68 through an idler gear wheel 89. The collar 87 has a screw threaded bore which co-operates with a screw threaded portion 90 on the shaft 68 and is rotatably mounted on a shaft casing 91 on one end of which is carried the bearing 76 supporting the plate 75. The shaft casing 91 is keyed to the shaft and therefore does not rotate relative to it. As the gear 86 is turned to rotate the collar 87 relative to the shaft 68 the shaft casing 91 is moved along the shaft 68.

In use the plug 69 is positioned in the bore of the pipe to be prepared and expanded so that the plug grips the bore. The pipe is then prepared by the tools 80 which are rotated relative to the pipe on the plate 75. Each time the plate 75 completes one revolution the pin 82 contacts the star wheel 83 and if the spring loading on the pin is not exceeded advances the star wheel by one tooth. The rotation is transmitted through the shaft 84 and the gear wheels 85, 89, 86 to the collar 87 to move the casing 91 relative to the shaft. Therefore as the cutting tools rotate the casing 91 moves along the shaft and the cutting tools traverse along the pipe. If there is any resistance to the movement of the cutting tools along the pipe the shaft 84 will not be able to rotate and the pin 81 will be caused to retract against its spring loading. The cutting tools will not then be traversed along the pipe. When the cutting tools have traversed a sufficient length of the pipe a flange 92 at the end of the shaft contacts a lever 93 which is set at the appropriate position and operates a plunger which disconnects the drive to the gear 86. The flange 92 is adjustable in height by rotating around a threaded head portion 95 of the shaft 68. The speed at which the cutting tools traverse the pipe may be increased by providing more than one (for example four) pins such as the pin 82 around the periphery of the plate 75.

In a similar manner to that described above for the cutting unit an orbital welding unit (not shown) may be mounted on a pipe after preparation and may be rotated during the welding process by the driving unit 1.

Figure 13:
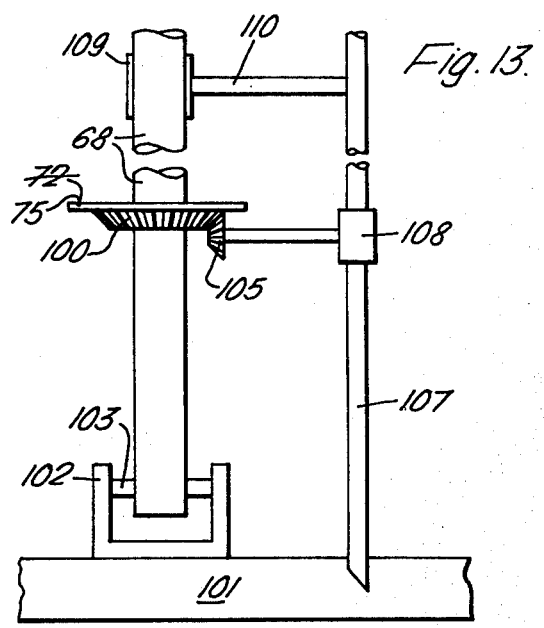
FIG. 13 is a diagrammatic view of a tool for trepanning metal plate.

Reference is now made to FIG. 13, which is a diagrammatic Figure and wherein like reference numerals are used for like parts in the preceding Figures. FIG. 13 shows a tool for cutting holes of a preselected diameter in metal plates ie trepanning, such as for example walls of a boiler. Part of a metal plate is indicated by 101. A carriage 102 is welded to the plate 101, but any other type of fixed attachment may be used. The carriage contains a mounting 103 for the shaft 68.

When set up for trepanning, the level gear 100 drivably engages a level gear 105 in a cross-slide arrangement as explained below. The level gear 105 drives a cutter member 107 towards the plate 101 via a gearing 108. The cutter member is rotated about the shaft 68 as the plate 75 rotates and one strut connection of the cross-slide between sleeving 109 of the shaft and the cutter member 107 is indicated by 110.

In operation, the cutter member 107 rotates around the central shaft 68 to trepann the metal plate 101, the level gear 105 is rotated by the level gear 100 so that the outlet member is progressed into the plate 101. The depth of cut into the plate is defined by the position of the flange 92 and its interaction with the lever 93. Overload of the trepanning unit is inhibited by interaction of the spring loaded pin and starwheel as explained above.

The tools described above have a high power output for their small physical size since they can cut seven centimeter stainless steel pipe in three and a half minutes. Moreover they operate completely unattended and can be utilised in dangerous areas such as radioactive areas.

The tools described hereinbefore are capable of doing many jobs which would normally be performed on a lathe. The tools described however are portable and may be used in situ without the need to dismantle the equipment in which the pipe is located. Because the tools can be assembled on the pipe they may be used where access is difficult and because of the features which prevent overloading may be operated remotely after they have been positioned on the pipe.

I claim:

1. A rotary tool for metal working comprising a drive unit attachable to the metal to be worked, a drive detachably engageable in the drive unit and a rotary metal working unit driven by the drive unit, the drive unit including means for controlling the extent of working by the metal working unit, said means comprising means for detecting loading on the working unit and controlling working to restrict said loading to within a preselected limit.

2. A rotary tool as claimed in claim 1, in which said means for detecting loading and controlling working comprises a spring loading of preselected resilience.

3. A rotary tool as claimed in claim 1 wherein said last mentioned means controls working by controlling relative advancement of the metal working unit so as to effect repetitive working in response to detected loading beyond said preselected limit.

4. A rotary tool for metal working comprising a drive unit attachable to the metal to be worked, a drive detachably engageable in the drive unit, and a rotary metal working unit driven by the drive unit, the drive unit including means for controlling the extent of working by the metal working unit, said means comprising means including a spring loading of preselected resilience for detecting loading on the working unit and controlling working to restrict said loading to within a preselected limit, and means for stopping further working after a preselected degree of working has been completed.

5. A rotary tool as claimed in claim 4, in which the metal working unit is resiliently mounted to allow for sharp loads on the working unit.

6. A rotary tool as claimed in claim 5, in which the metal working unit comprises a pipe cutter.

7. A rotary tool as claimed in claim 6, in which the pipe cutter comprises a pipe cutting wheel which is urged towards the pipe by means including a ratchet fed cam.

8. A rotary tool as claimed in claim 4, in which the metal working unit comprises a pipe weld preparation tool.

9. A rotary tool as claimed in claim 8, in which the drive unit is attachable to the pipe by means of an expandible plug.

10. A rotary tool as claimed in claim 4, in which, the metal working unit comprises a trepanning tool.

* * * * *